US010871468B2

(12) United States Patent
Das et al.

(10) Patent No.: US 10,871,468 B2
(45) Date of Patent: Dec. 22, 2020

(54) NON-CONTACT MATERIAL INSPECTION

(71) Applicant: Tata Consultancy Services Limited, Mumbai (IN)

(72) Inventors: Rajat Kumar Das, Kolkata (IN); Arijit Sinharay, Kolkata (IN); Smriti Rani, Kolkata (IN); Andrew Gigie, Kolkata (IN); Tapas Chakravarty, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 64 days.

(21) Appl. No.: 16/293,468

(22) Filed: Mar. 5, 2019

(65) Prior Publication Data
US 2020/0141903 A1 May 7, 2020

(30) Foreign Application Priority Data
Nov. 5, 2018 (IN) .............................. 201821041789

(51) Int. Cl.
*G01N 27/72* (2006.01)
*G01S 7/35* (2006.01)
*G01S 13/06* (2006.01)
*G01S 13/88* (2006.01)

(52) U.S. Cl.
CPC ................ *G01N 27/72* (2013.01); *G01S 7/35* (2013.01); *G01S 13/06* (2013.01); *G01S 13/88* (2013.01)

(58) Field of Classification Search
CPC ........ G01N 27/72; G01N 22/00; G01S 13/32; G01S 7/417; G01S 7/35; G01S 13/06; G01S 13/88; G01S 13/04
See application file for complete search history.

(56) References Cited

U.S. PATENT DOCUMENTS

| 6,094,158 A * | 7/2000 | Williams ............... A61H 3/061 |
| | | 342/157 |
| 6,782,328 B2 | 8/2004 | Lovegren et al. |
| 2012/0080515 A1* | 4/2012 | van der Merwe ... G06K 7/1447 |
| | | 235/375 |

FOREIGN PATENT DOCUMENTS

| CN | 105469079 | 4/2016 |
| CN | 107169469 | 9/2017 |
| CN | 107290746 | 10/2017 |

OTHER PUBLICATIONS

Christoph Sklarczyk, "Determination of Material Properties like Permittivity and Density with Microwaves", Apr. 2014, Journal of Modern Physics, 5 pages:335-340.*

(Continued)

*Primary Examiner* — Akm Zakaria
(74) *Attorney, Agent, or Firm* — Finnegan, Henderson, Farabow, Garrett & Dunner, LLP

(57) ABSTRACT

This disclosure relates to non-contact inspection of material for identifying and estimate composition of a material under inspection. Traditionally, material inspection is an invasive process involving contact based approaches. A radar-based approach requires placement of the radar at a specific location, which is a challenge since amplitude of the reflected signal, depends on the distance from the material under inspection. The present disclosure addresses this technical problem by providing a Continuous Wave radar-based approach that is based on absolute slope at extrema points on the reflected signal from the material under inspection.

8 Claims, 5 Drawing Sheets

(56) References Cited

OTHER PUBLICATIONS

Soni, A.H. et al. (2011). "Microwave Based Classification of Material: A Statistical Approach," *International Journal of Advanced Research in Computer Science*, vol. 2, No. 6; pp. 214-216.

* cited by examiner

NON-CONTACT MATERIAL INSPECTION

PRIORITY CLAIM

This U.S. patent application claims priority under 35 U.S.C. § 119 to: Indian Patent Application No. 201821041789, filed on 5 Nov. 2018. The entire contents of the aforementioned application are incorporated herein by reference.

TECHNICAL FIELD

The disclosure herein generally relates to material inspection, and, more particularly, to systems and computer implemented methods for non-contact inspection of materials for classification and estimating composition of the material.

BACKGROUND

Material inspection typically involves identification of the material under inspection and sometimes investigation of the quality of the material under inspection. Traditionally, material inspection involves contact-based approaches. Again, precision control of motors and stable platforms are required for such inspection approaches which may not always be feasible.

SUMMARY

Embodiments of the present disclosure present technological improvements as solutions to one or more of the above-mentioned technical problems recognized by the inventors in conventional systems.

In an aspect, there is provided a processor implemented method comprising the steps of: computing, by a controller unit, extrema points within an empirically determined length of a reflected signal, the reflected signal being a signal reflected off a sample material in a sample set in response to a transmitted signal from a Continuous Wave (CW) radar; identifying, by the controller unit, maxima points and minima points from the extrema points by performing a second order derivative thereon; computing, by the controller unit, absolute slope of each line between a maxima point and a consecutive minima point from the identified maxima points and minima points based on associated amplitude and distance of the CW radar from the corresponding sample material; generating, by the controller unit, a first feature set comprising average of slopes computed for a plurality of iterations of the steps of computing the extrema points, identifying the maxima points and the minima points thereof and computing the absolute slope of each line, corresponding to each sample material from the sample set; training, a classifier model, using the generated first feature set; and classifying a material under inspection based on absolute slope computed using any two consecutive extrema points using the trained classifier model.

In another aspect, there is provided a non-contact inspection apparatus comprising: a Continuous Wave (CW) radar configured to slide towards or away from a material under inspection; a motor configured to move the CW radar towards or away from the material under inspection; a controller unit comprising: one or more data storage devices configured to store instructions; and one or more hardware processors operatively coupled to the one or more data storage devices, wherein the one or more hardware processors are configured by the instructions to: control the movement of the CW radar, via the motor; compute extrema points within an empirically determined length of a reflected signal, the reflected signal being a signal reflected off a sample material in a sample set in response to a transmitted signal from the CW radar; identify maxima points and minima points from the extrema points by performing a second order derivative thereon; compute absolute slope of each line between a maxima point and a consecutive minima point from the identified maxima points and minima points based on associated amplitude and distance of the CW radar from the corresponding sample material; generate a first feature set comprising average of slopes computed for a plurality of iterations of the steps of computing the extrema points, identifying the maxima points and the minima points thereof and computing the absolute slope of each line, corresponding to each sample material from the sample set; train a classifier model using the generated first feature set; generate a second feature set comprising the first feature set and composition of each sample material in the sample set; and train a regression model using the generated second feature set; the classifier model configured to classify the material under inspection based on absolute slope computed using any two consecutive extrema points; and the regression model configured to estimate composition of the material under inspection based on absolute slope computed using any two consecutive extrema points.

In yet another aspect, there is provided a system comprising: one or more data storage devices operatively coupled to one or more hardware processors and configured to store instructions configured for execution by the one or more hardware processors to: compute extrema points within an empirically determined length of a reflected signal, the reflected signal being a signal reflected off a sample material in a sample set in response to a transmitted signal from a Continuous Wave (CW) radar; identify maxima points and minima points from the extrema points by performing a second order derivative thereon; compute absolute slope of each line between a maxima point and a consecutive minima point from the identified maxima points and minima points based on associated amplitude and distance of the CW radar from the corresponding sample material; generate a first feature set comprising average of slopes computed for a plurality of iterations of the steps of computing the extrema points, identifying the maxima points and the minima points thereof and computing the absolute slope of each line, corresponding to each sample material from the sample set; train a classifier model using the generated first feature set; generate a second feature set comprising the first feature set and composition of each sample material in the sample set; and train a regression model using the generated second feature set.

In accordance with an embodiment of the present disclosure, the empirically determined length of the reflected signal is $2.5\lambda$, and wherein $\lambda$ represents wavelength of the reflected signal.

In accordance with an embodiment of the present disclosure, the one or more processors are further configured to compute the extrema points by: moving the CW radar in steps of $\lambda/10$ within the $2.5\lambda$ from a starting point being at a distance of at least $6\lambda$ from the sample material; measuring a baseband signal $B(t)$ corresponding to the reflected signal at each $\lambda/10$ distance; performing a first order derivative of the measured baseband signal $B(t)$; and identifying points where the first order derivative is zero as the extrema points.

In accordance with an embodiment of the present disclosure, the baseband signal $B(t)$ is obtained by mixing the reflected signal with a local oscillator signal $T(t)$ and passing a resultant signal through a low pass filter.

In accordance with an embodiment of the present disclosure, the maxima points are the extrema points for which the second derivative is negative and slope of the baseband signal is at first positive and then goes through zero to become negative; and the minima points are the extrema points for which the second derivative is positive and the slope of the baseband signal is at first negative and then goes through zero to become positive.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
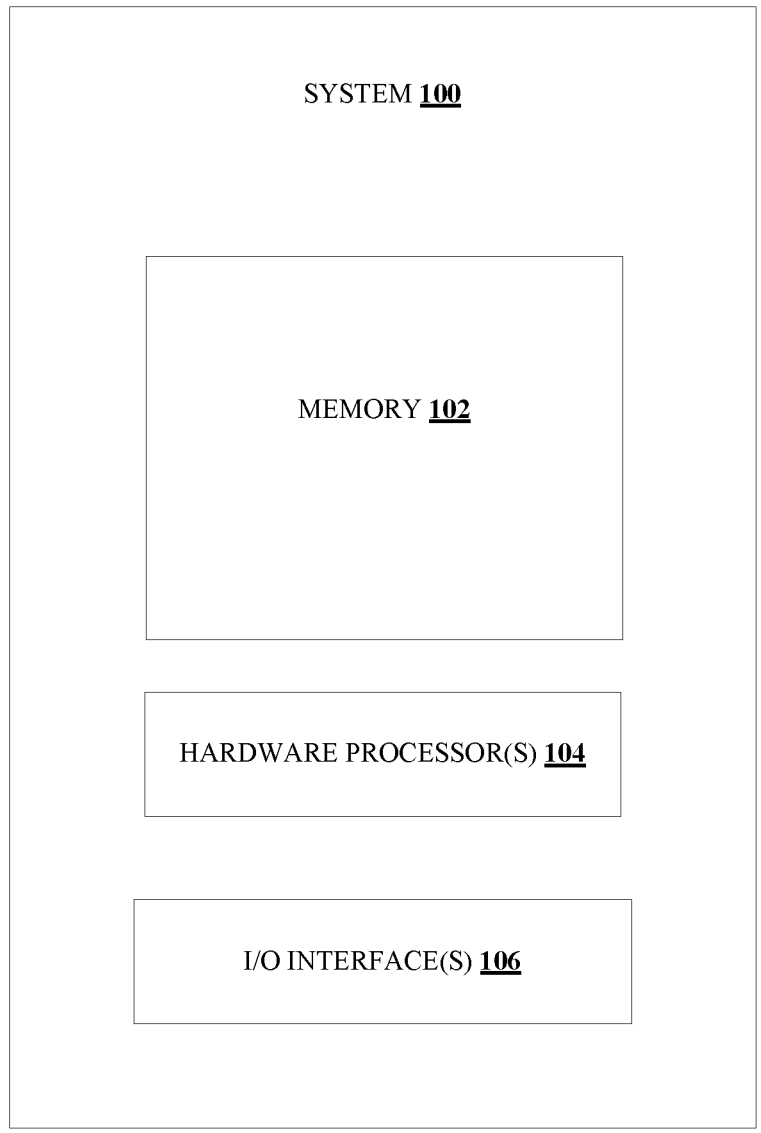
FIG. 1 illustrates an exemplary block diagram of a system for non-contact material inspection, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Fundamentally, material inspection is an invasive process involving contact based approaches. A radar-based approach requires placement of the radar at a specific location, which is a challenge since amplitude of the reflected signal, depends on this distance. The present disclosure addresses this technical problem by providing a radar-based approach that is based on slope at extrema points on the reflected signal. Besides facilitating classification of the material under inspection, the present disclosure also facilitates quality check of the material under inspection. In the context of the present disclosure, classification of the material implies classifying the type of material, for instance, whether the material is material A or material B. Likewise, quality check of the material, in the context of the present disclosure implies mapping a material under inspection to a material having a known composition.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for non-contact material inspection in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

Figure 2A:
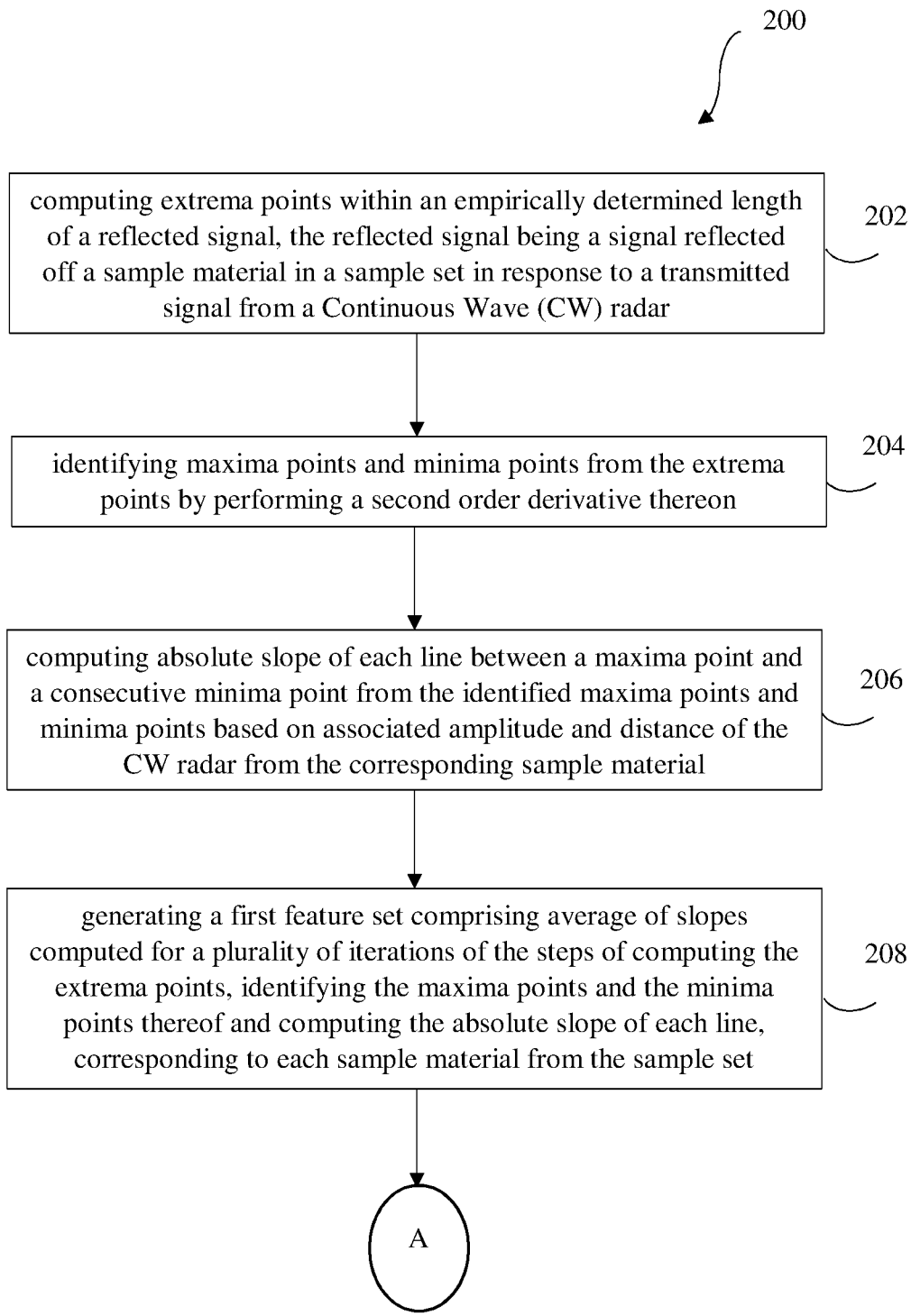
FIG. 2A through FIG. 2B illustrates an exemplary flow diagram of a computer-implemented method for non-contact material inspection, in accordance with an embodiment of the present disclosure.
Figure 2B:
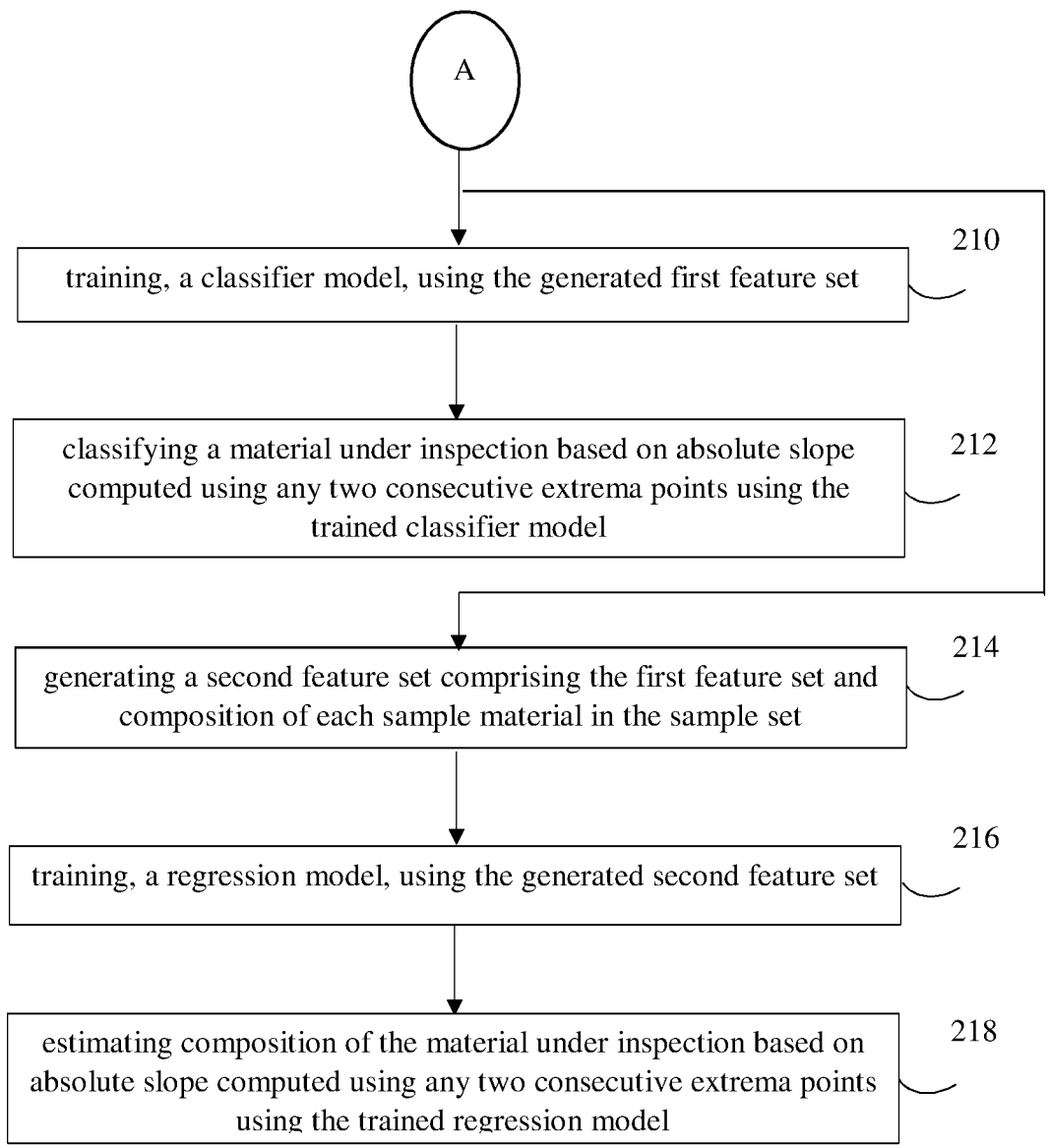
Figure 3:
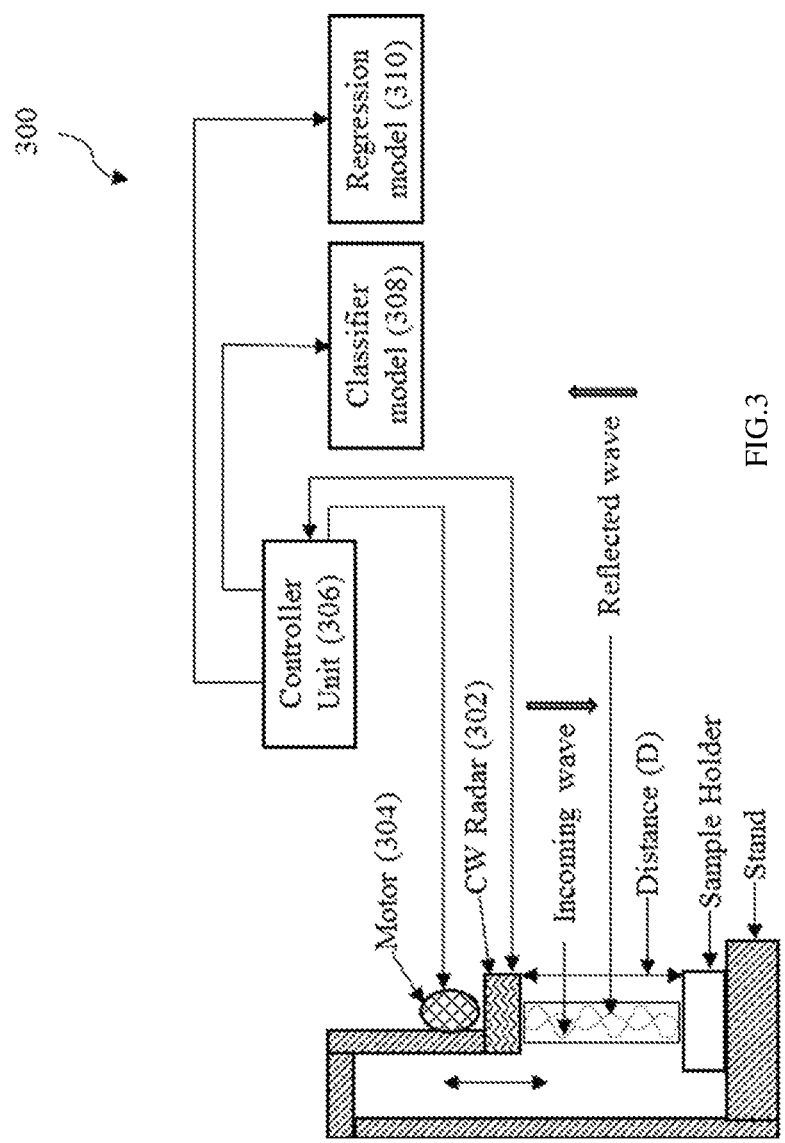
FIG. 3 illustrates a schematic representation of a non-contact material inspection apparatus, in accordance with an embodiment of the present disclosure.

FIG. 2A through FIG. 2B illustrate an exemplary flow diagram for a computer implemented method 200 for non-contact material inspection, in accordance with an embodiment of the present disclosure and FIG. 3 illustrates a schematic representation of a non-contact material inspection apparatus 300, in accordance with an embodiment of the present disclosure. The steps of the method 200 will now be explained in detail with reference to the components of the non-contact material inspection apparatus of FIG. 3 and the system 100 of FIG. 1, wherein a controller unit 306 of FIG. 3 is configured to perform steps analogous to the one or more processors 104 of the system 100 of FIG. 1.

In accordance with an embodiment of the present disclosure, the non-contact material inspection apparatus 300 of FIG. 3 comprises a Continuous Wave (CW) radar 302 configured to slide towards or away from a material under inspection. In an embodiment, a stand holds the CW radar aimed downwards at the material under inspection (placed on a sample holder as illustrated). The stand facilitates sliding of the CW radar along the height of the stand via a motor 304 configured to move the CW radar towards or away from the material under inspection. In an embodiment, the controller unit 306 comprises: one or more data storage devices configured to store instructions; and one or more hardware processors operatively coupled to the one or more data storage devices is provided, wherein the one or more hardware processors are configured by the instructions to: control the movement of the CW radar 302, via the motor 304 to vary the distance from the material under inspection with good resolution. Thus, the motor 304 and input/output of the CW radar 302 are controlled by the controller unit 306. In an embodiment, data acquired may be stored in the one or more data storage devices of the controller unit 306. In an embodiment, the non-contact material inspection apparatus 300 may also comprise a classifier model 308 configured to classify the material under inspection; and a regression model 310 configured to estimate composition of the material under inspection. The controller unit 306 is also configured to perform a plurality of steps for enabling the classifier model to classify the material under inspection and for enabling the regression model to estimate composition of the material under inspection in accordance with method 200 of the present disclosure explained hereinafter.

Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

A transmitter/local-oscillator of a CW radar generates an electromagnetic wave or signal (incoming wave of FIG. 3 or transmitted wave) as per equation (1).

$$T(t) = L(t) = \cos(2\pi f t) \quad (1)$$

wherein f represent the transmitting frequency, T(t) is the transmitted wave and L(t) represents the local oscillator wave.

Then a receiver of the CW radar receives a reflected signal (reflected wave of FIG. 3) from the material under inspection as per equation (2).

$$R(t) = A_r \cos(2\pi f (t - T_R)) \quad (2)$$

$$T_R = \frac{2D}{c} \quad (3)$$

$$A_r = \sqrt{\frac{2P_T G^2 \sigma \lambda^2 Z \Gamma^2}{4\pi^3 D^4}} \quad (4)$$

$$\Gamma = \frac{\sqrt{\varepsilon_{r1}} - \sqrt{\varepsilon_{r2}}}{\sqrt{\varepsilon_{r1}} + \sqrt{\varepsilon_{r2}}} \quad (5)$$

wherein amplitude $A_r$ of the reflected signal is dependent on parameters of the CW radar as shown in equation (4), wherein $P_T$ is the transmitted antenna power, G is the transmitter/receiver antenna gain, σ is the radar cross section, λ is the transmitted wavelength (also equal to the reflected wavelength), Z is the input impedance, Γ is the reflection coefficient, and D is the distance between the CW radar and the material under inspection. The reflection coefficient Γ is in turn dependent on $\varepsilon_{r1}$ and $\varepsilon_{r2}$, the relative dielectric constants of air and the material under inspection respectively.

A baseband signal B(t) corresponding to the reflected signal R(t) is obtained by mixing the reflected signal R(t) with a local oscillator signal T(t) and passing a resultant signal through a low pass filter. The baseband signal may be represented as equation (6).

$$B(t) = \frac{A_r}{2} \cos\left(\frac{4\pi f D}{c}\right) \quad (6)$$

$$B(t) = \frac{A_r}{2} \quad (7)$$

wherein c represents velocity of light.

It may be noted that equation (7) gives the highest signal amplitude at extrema points.

It may also be noted from equation (7) that the baseband signal B(t) is proportional to the amplitude $A_r$. From equation (4), it may be noted that the amplitude $A_r$ is a function of the dielectric constant $\varepsilon_{r2}$ of the material under inspection and the distance D between the CW radar and the material under inspection. Hence if the feature is independent of the distance D, the dielectric constant $\varepsilon_{r2}$ of the material under inspection can serve as an indicator for classifying the material. The present disclosure focusses on this observation to enable classification of a material under inspection.

In accordance with the present disclosure, firstly the classifier model 308 and the regression model 310 are trained using a first feature set and a second feature set respectively, that are generated using each sample material in a sample set.

In accordance with an embodiment of the present disclosure, the one or more processors 104 (and the controller unit 306 of FIG. 3) are configured to compute, at step 202, extrema points within an empirically determined length of the reflected signal, the reflected signal being a signal reflected off a sample material in the sample set in response to a transmitted signal from the CW radar (302 of FIG. 3). In an embodiment, the empirically determined length of the reflected signal is 2.5λ, wherein λ represents wavelength of the reflected signal.

In accordance with an embodiment of the present disclosure, the step of computing extrema points comprises firstly moving the CW radar 302 in steps of λ/10 within the 2.5λ from a starting point. In an embodiment, the starting point may be at a distance of at least 6λ from the sample material. The baseband signal B(t) corresponding to the reflected signal is then measured at each λ/10 distance. A first order derivative of the measured baseband signal B(t) is performed. Points at which the first order derivative is zero are identified as the extrema points.

In accordance with an embodiment of the present disclosure, the one or more processors 104 (and the controller unit 306 of FIG. 3) are configured to identify, at step 204, maxima points and minima points from the extrema points by performing a second order derivative. In an embodiment, the maxima points are the extrema points for which the second derivative is negative and slope of the baseband signal is at first positive and then goes through zero to become negative. Also, in an embodiment, the minima points are the extrema points for which the second derivative is positive and the slope of the baseband signal is at first negative and then goes through zero to become positive.

In accordance with an embodiment of the present disclosure, the one or more processors 104 (and the controller unit 306 of FIG. 3) are configured to compute, at step 206, absolute slope of each line between a maxima point and a consecutive minima point from the identified maxima points and minima points based on associated amplitude and distance of the CW radar from the corresponding sample material.

The absolute slopes of each line may be represented as per equations (8) through (11) below.

$$Slope1 = abs\left[\frac{(A_2 - A_1)}{(D_2 - D_1)}\right] \rightarrow \quad (8)$$

$$Slope2 = abs\left[\frac{(A_3 - A_2)}{(D_3 - D_2)}\right] \rightarrow \quad (9)$$

$$Slope3 = abs\left[\frac{(A_4 - A_3)}{(D_4 - D_3)}\right] \rightarrow \quad (10)$$

$$Slope4 = abs\left[\frac{(A_5 - A_4)}{(D_5 - D_4)}\right] \rightarrow \quad (11)$$

wherein $A_1, A_2, A_3, A_4, A_5$ represent the amplitudes and $D_1, D_2, D_3, D_4, D_5$ represent the corresponding distance of the CW radar from the sample material at the respective extrema points.

In accordance with an embodiment of the present disclosure, the one or more processors 104 (and the controller unit 306 of FIG. 3) are configured to generate, at step 208, a first feature set comprising average of slopes (Slope1, Slope2, Slope3, Slope4) computed for a plurality of iterations of the steps of computing the extrema points, identifying the maxima points and the minima points thereof and computing the absolute slope of each line, corresponding to each sample material from the sample set.

Figure 4:
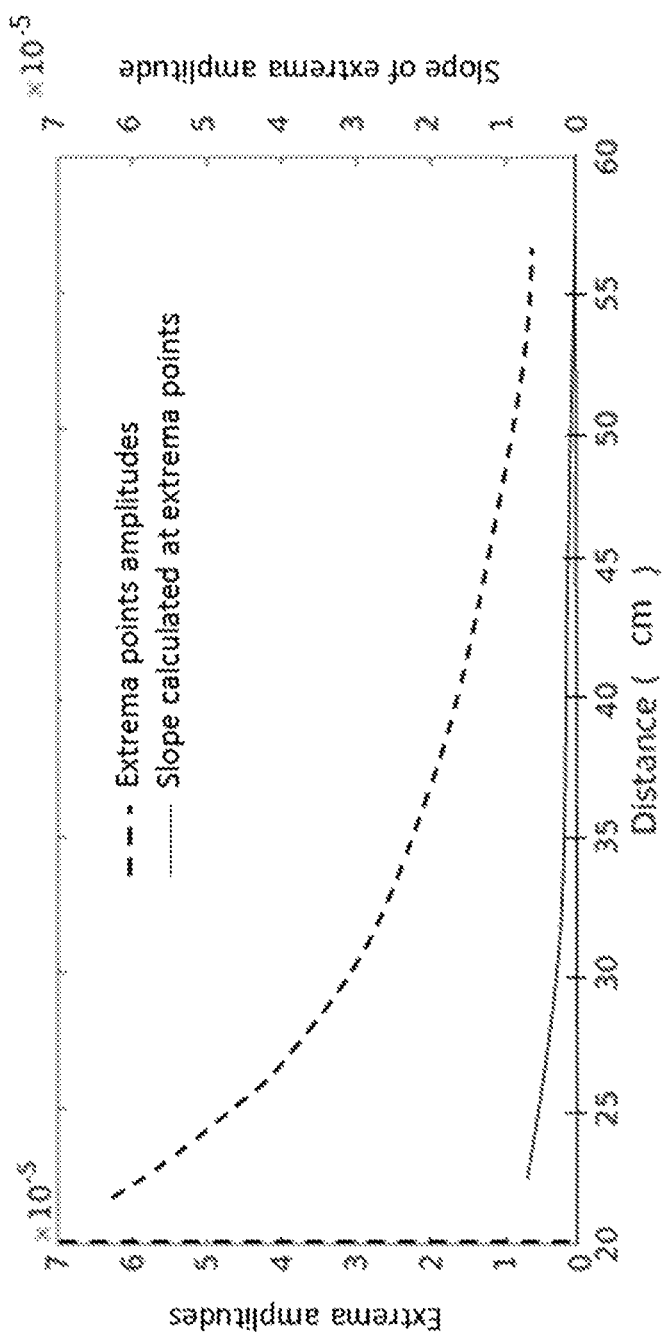
FIG. 4 illustrates a graphical illustration of a feature set based on amplitude as known in the art vis-à-vis a feature set based on slope, in accordance with an embodiment of the present disclosure.

FIG. 4 illustrates a graphical illustration of a feature set based on amplitude as known in the art vis-à-vis a feature set based on slope, in accordance with an embodiment of the present disclosure. It may be noted that the slope at extrema points is more or less constant unlike the amplitude used in the art, thereby providing a more reliable feature set for classifying a material under inspection.

In accordance with an embodiment of the present disclosure, the one or more processors 104 (and the controller unit 306 of FIG. 3) are configured to train, at step 210, the classifier model 308, using the generated first feature set as described above. Practically the steps may undergo about 40 iterations for each sample material to generate adequate training data for machine learning algorithms. However, when testing a material under inspection, only two extrema points are needed to evaluate the slope. Accordingly, in an embodiment of the present disclosure, the one or more processors 104 (and the controller unit 306 of FIG. 3) are configured to classify, at step 212, the material under inspection based on absolute slope computed using any two consecutive extrema points using the trained classifier model 308.

Another application of the systems and methods of the present disclosure is estimating composition of the material under inspection. For instance, water percentage in emulsified fuel. Regression based analyses is used for this purpose, wherein regression is a statistical measure used to investigate the relationship between variables and how one variable (dependent variable) can be affected by one or more variables (independent variables). Once the regression model is trained and a regression curve is obtained the regression curve may be used to estimate percentage composition of the material under inspection.

Accordingly, in an embodiment of the present disclosure, the one or more processors 104 (and the controller unit 306 of FIG. 3) are configured to generate, at step 214, a second feature set comprising the first feature set (average slopes) and composition of each sample material in the sample set. The regression model 310 is then trained, at step 216, using the generated second feature set. The trained regression model 310 may then be used to estimate composition of the material under inspection, at step 218, based on absolute slope computed using any two consecutive extrema points using the trained regression model 310.

Thus systems and methods of the present disclosure not only facilitates classification of a material under inspection, but also enables estimating the composition by a non-contact approach.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method comprising the steps of:
   computing, by a controller unit, extrema points within an empirically determined length of a reflected signal, the reflected signal being a signal reflected off a sample material in a sample set in response to a transmitted signal from a Continuous Wave (CW) radar, wherein the empirically determined length of the reflected signal is 2.5$\lambda$, wherein $\lambda$ represents wavelength of the reflected signal, and wherein the step of computing extrema points comprises:
      moving the CW radar in steps of $\lambda/10$ within the 2.5$\lambda$ from a starting point being at a distance of at least 6$\lambda$, from the sample material;
      measuring a baseband signal B(t) corresponding to the reflected signal at each $\lambda/10$ distance;
      performing a first order derivative of the measured baseband signal B(t); and
      identifying points where the first order derivative is zero as the extrema points;
   identifying, by the controller unit, maxima points and minima points from the extrema points by performing a second order derivative thereon;
   computing, by the controller unit, absolute slope of each line between a maxima point and a consecutive minima point from the identified maxima points and minima points based on associated amplitude and distance of the CW radar from the corresponding sample material;
   generating, by the controller unit, a first feature set comprising average of slopes computed for a plurality of iterations of the steps of computing the extrema points, identifying the maxima points and the minima points thereof and computing the absolute slope of each line, corresponding to each sample material from the sample set;
   training, a machine learning based classifier model, using the generated first feature set; and
   classifying a material under inspection based on absolute slope computed using any two consecutive extrema points using the trained classifier model.

2. The processor implemented method of claim 1, wherein the baseband signal B(t) is obtained by mixing the reflected signal with a local oscillator signal T(t) and passing a resultant signal through a low pass filter.

3. The processor implemented method of claim 1, wherein the maxima points are the extrema points for which the second derivative is negative and slope of the baseband signal is at first positive and then goes through zero to become negative; and the minima points are the extrema points for which the second derivative is positive and the slope of the baseband signal is at first negative and then goes through zero to become positive.

4. The processor implemented method of claim 1, wherein the step of generating a first feature set is followed by:
   generating, by the controller unit, a second feature set comprising the first feature set and composition of each sample material in the sample set;
   training, a regression model, using the generated second feature set; and
   estimating composition of the material under inspection based on absolute slope computed using any two consecutive extrema points using the trained regression model.

5. A non-contact material inspection apparatus comprising:
   a Continuous Wave (CW) radar configured to slide towards or away from a material under inspection;
   a motor configured to move the CW radar towards or away from the material under inspection;
   a controller unit comprising:
      one or more data storage devices configured to store instructions; and
      one or more hardware processors operatively coupled to the one or more data storage devices, wherein the one or more hardware processors are configured by the instructions to:
         control the movement of the CW radar, via the motor;
         compute extrema points within an empirically determined length of a reflected signal, the reflected signal being a signal reflected off a sample material in a sample set in response to a transmitted signal from the CW radar, wherein the empirically determined length of the reflected signal is 2.5$\lambda$, wherein $\lambda$ represents wavelength of the reflected signal, and wherein the step of computing extrema points comprises:
            moving the CW radar in steps of $\lambda/10$ within the 2.5$\lambda$ from a starting point being at a distance of at least 6$\lambda$, from the sample material;
            measuring a baseband signal B(t) corresponding to the reflected signal at each $\lambda/10$ distance;
            performing a first order derivative of the measured baseband signal B(t); and identifying points where the first order derivative is zero as the extrema points;
identify maxima points and minima points from the extrema points by performing a second order derivative thereon;
compute absolute slope of each line between a maxima point and a consecutive minima point from the identified maxima points and minima points based on associated amplitude and distance of the CW radar from the corresponding sample material;
generate a first feature set comprising average of slopes computed for a plurality of iterations of the steps of computing the extrema points, identifying the maxima points and the minima points thereof and computing the absolute slope of each line, corresponding to each sample material from the sample set;
train a machine learning based classifier model using the generated first feature set;
generate a second feature set comprising the first feature set and composition of each sample material in the sample set; and
train a regression model using the generated second feature set;
the classifier model configured to classify the material under inspection based absolute slope computed using any two consecutive extrema points; and
the regression model configured to estimate composition of the material under inspection based on absolute slope computed using any two consecutive extrema points.

6. A system comprising:
one or more data storage devices operatively coupled to one or more hardware processors and configured to store instructions configured for execution by the one or more hardware processors to:
compute extrema points within an empirically determined length of a reflected signal, the reflected signal being a signal reflected off a sample material in a sample set in response to a transmitted signal from a Continuous Wave (CW) radar, wherein the empirically determined length of the reflected signal is $2.5\lambda$, wherein $\lambda$ represents wavelength of the reflected signal, and wherein the step of computing extrema points comprises:
moving the CW radar in steps of $\lambda/10$ within the $2.5\lambda$ from a starting point being at a distance of at least $6\lambda$, from the sample material;
measuring a baseband signal B(t) corresponding to the reflected signal at each $\lambda/10$ distance;
performing a first order derivative of the measured baseband signal B(t); and
identifying points where the first order derivative is zero as the extrema points;
identify maxima points and minima points from the extrema points by performing a second order derivative thereon;
compute absolute slope of each line between a maxima point and a consecutive minima point from the identified maxima points and minima points based on associated amplitude and distance of the CW radar from the corresponding sample material;
generate a first feature set comprising average of slopes computed for a plurality of iterations of the steps of computing the extrema points, identifying the maxima points and the minima points thereof and computing the absolute slope of each line, corresponding to each sample material from the sample set;
train a machine learning based classifier model using the generated first feature set;
generate a second feature set comprising the first feature set and composition of each sample material in the sample set; and
train a regression model using the generated second feature set.

7. The system of claim 6, wherein the baseband signal B(t) is obtained by mixing the reflected signal with a local oscillator signal T(t) and passing a resultant signal through a low pass filter.

8. The system of claim 6, wherein the maxima points are the extrema points for which the second derivative is negative and slope of the baseband signal is at first positive and then goes through zero to become negative; and the minima points are the extrema points for which the second derivative is positive and the slope of the baseband signal is at first negative and then goes through zero to become positive.

* * * * *